United States Patent
Dorado et al.

(10) Patent No.: US 12,356,087 B2
(45) Date of Patent: Jul. 8, 2025

(54) SYSTEM AND METHOD FOR EXTENDING DEPTH OF FIELD FOR 2D VISION SYSTEM CAMERAS IN THE PRESENCE OF MOVING OBJECTS

(71) Applicant: Cognex Corporation, Natick, MA (US)

(72) Inventors: Jose Fernandez Dorado, Aachen (DE); Esther Oteo Lozano, Aachen (DE); Pablo Garcia Campos, Aachen (DE); Laurens Nunnink, Simpleveld (NL)

(73) Assignee: Cognex Corporation, Natick, MA (US)

( * ) Notice: Subject to any disclaimer, the term of this patent is extended or adjusted under 35 U.S.C. 154(b) by 1022 days.

(21) Appl. No.: 16/923,219

(22) Filed: Jul. 8, 2020

(65) Prior Publication Data
US 2022/0014682 A1    Jan. 13, 2022

(51) Int. Cl.
*H04N 23/959* (2023.01)
*G02B 3/14* (2006.01)
(Continued)

(52) U.S. Cl.
CPC ............. *H04N 23/959* (2023.01); *G02B 3/14* (2013.01); *G02B 7/003* (2013.01); *G02B 7/021* (2013.01);
(Continued)

(58) Field of Classification Search
CPC .......... H04N 23/55; G02B 3/14; G02B 7/003; G02B 7/021; G02B 7/1822; G03B 5/06; G03B 13/32
See application file for complete search history.

(56) References Cited

U.S. PATENT DOCUMENTS

| 4,978,860 A | 12/1990 | Bayley |
| 6,689,998 B1 * | 2/2004 | Bremer ..................... G02B 7/28 235/462.23 |

(Continued)

FOREIGN PATENT DOCUMENTS

| EP | 3499404 A2 * | 6/2019 | ............. G06K 19/14 |
| EP | 3674695 A1 | 7/2020 | |

(Continued)

OTHER PUBLICATIONS

"Accuracy of Scheimpflug corneal power measurements for intraocular lens power calculation," Giacomo Savini, et al., J Cataract Refract Surg—vol. 35, Jul. 2009 https://www.bon.de/wp-content/uploads/2021/09/File-1395214613.pdf.

(Continued)

*Primary Examiner* — Hwa Andrew Lee
(74) *Attorney, Agent, or Firm* — Loginov & Associates, PLLC; William A. Loginov

(57) ABSTRACT

This invention provides a system and method for enhanced depth of field (DOF) advantageously used in logistics applications, scanning for features and ID codes on objects. It effectively combines a vision system, a glass lens designed for on-axis and Scheimpflug configurations, a variable lens and a mechanical system to adapt the lens to the different configurations without detaching the optics. The optics can be steerable, which allows it to adjust between variable angles so as to optimize the viewing angle to optimize DOF for the object in a Scheimpflug configuration. One, or a plurality, of images can be acquired of the object at one, or differing angle settings, with the entire region of interest clearly imaged. In another implementation, the optical path can include a steerable mirror and a folding mirror overlying the region of interest, which allows different multiple images to be acquired at different locations on the object.

20 Claims, 12 Drawing Sheets

(51) Int. Cl.

| | |
|---|---|
| *G02B 7/00* | (2021.01) |
| *G02B 7/02* | (2021.01) |
| *G02B 7/182* | (2021.01) |
| *G03B 5/06* | (2021.01) |
| *G03B 13/32* | (2021.01) |
| *G06K 7/14* | (2006.01) |
| *H04N 23/55* | (2023.01) |

(52) U.S. Cl.
CPC ............ *G02B 7/1822* (2013.01); *G03B 5/06* (2013.01); *G03B 13/32* (2013.01); *G06K 7/1413* (2013.01); *G06K 7/1417* (2013.01); *H04N 23/55* (2023.01)

(56) References Cited

U.S. PATENT DOCUMENTS

| | | | |
|---|---|---|---|
| 7,119,351 B2 | 10/2006 | Woelki | |
| 9,519,289 B2 | 12/2016 | Munich | |
| 9,575,221 B2 | 2/2017 | Nunnink | |
| 9,744,670 B2 | 8/2017 | Romanov | |
| 10,611,023 B2 | 4/2020 | Fong | |
| 10,628,646 B1 | 4/2020 | Lozano | |
| 10,679,024 B2 | 6/2020 | Bachelder | |
| 10,721,859 B2 | 7/2020 | Wu | |
| 10,795,060 B2 | 10/2020 | Nunnink | |
| 11,137,738 B2 | 10/2021 | Shapiro | |
| 11,301,655 B2 * | 4/2022 | Lozano | G06K 7/1417 |
| 2007/0164202 A1 | 7/2007 | Wurz | |
| 2007/0267584 A1 | 11/2007 | Cherry | |
| 2010/0078419 A1 * | 4/2010 | Johansen | B23K 26/02 219/121.79 |
| 2013/0265554 A1 * | 10/2013 | Baranec | G01J 3/32 353/121 |
| 2018/0048793 A1 * | 2/2018 | Gross | G02B 7/005 |
| 2018/0364463 A1 * | 12/2018 | Ferrari | G02B 17/008 |
| 2019/0228195 A1 | 7/2019 | Lozano | |
| 2020/0412954 A1 * | 12/2020 | Gaizman | H04N 23/6812 |
| 2023/0400753 A1 * | 12/2023 | Cohen | H04N 23/54 |

FOREIGN PATENT DOCUMENTS

| | | |
|---|---|---|
| JP | 63197926 | 8/1988 |
| JP | 201680546 | 5/2016 |
| JP | 201990931 | 6/2019 |
| JP | 202068398 | 4/2020 |
| JP | 2020074057 | 5/2020 |
| WO | 2016085717 A1 | 6/2016 |

OTHER PUBLICATIONS

"Clinical applications of the Scheimpflug principle in Ophthalmology," Fernando Faria-Correia, Rev Bras Oftalmol.2016;75(2):160-165 DOI: 10.5935/0034-7280.20160035.

"Development of a Scheimpflug slit lamp camera system for quantitative densitometric analysis," M A Vivino, et al., Eye, 1993.

"Intraocular Lens Power Calculation by Ray-Tracing after Myopic Excimer Laser Surgery," Giacomo Savini, et al., American Journal of Ophthalmology, 2013 https://www.bon.de/wp-content/uploads/2021/09/File-1395214566.pdf.

"Intrasubject repeatability of corneal morphology measurements obtained with a new Scheimpflug photography-based system," Raul Montalban, et al., J Cataract Refract Surg—vol. 38, Jun. 2012 https://www.bon.de/wp-content/uploads/2021/09/File-1395214683.pdf.

"Optical Superresolution," Zee Zlaevsky and David Mendlovic, Springer, 2004.

"Pachymetric measurements with a new Scheimpflug photography-based system," Myriam Milla, et al., J Cataract Refract Surg—vol. 37, Feb. 2011 https://www.bon.de/wp-content/uploads/2021/09/File-1395214744.pdf.

"Repeatability of automatic measurements by a new Scheimpflug camera combined with Placido topography," Giacomo Savini, et al., J Cataract Refract Surg—vol. 37, Oct. 2011 https://www.bon.de/wp-content/uploads/2021/09/File-1395214772.pdf.

"Scheimpflug stereocamera for particle image velocimetry in liquid flows," Ajay K. Prasad and Kirk Jensen, Appl. Opt. 34, 7092-7099, 1995 https://opg.optica.org/ao/abstract.cfm?URI=ao-34-30-7092.

"Scheimpflug-Placido topographer and optical low-coherence reflectometry biometer: Repeatability and agreement," Wuhe Chen, et al., J Cataract Refract Surg—vol. 38, Sep. 2012 https://www.bon.de/wp-content/uploads/2021/09/File-1395214844.pdf.

* cited by examiner

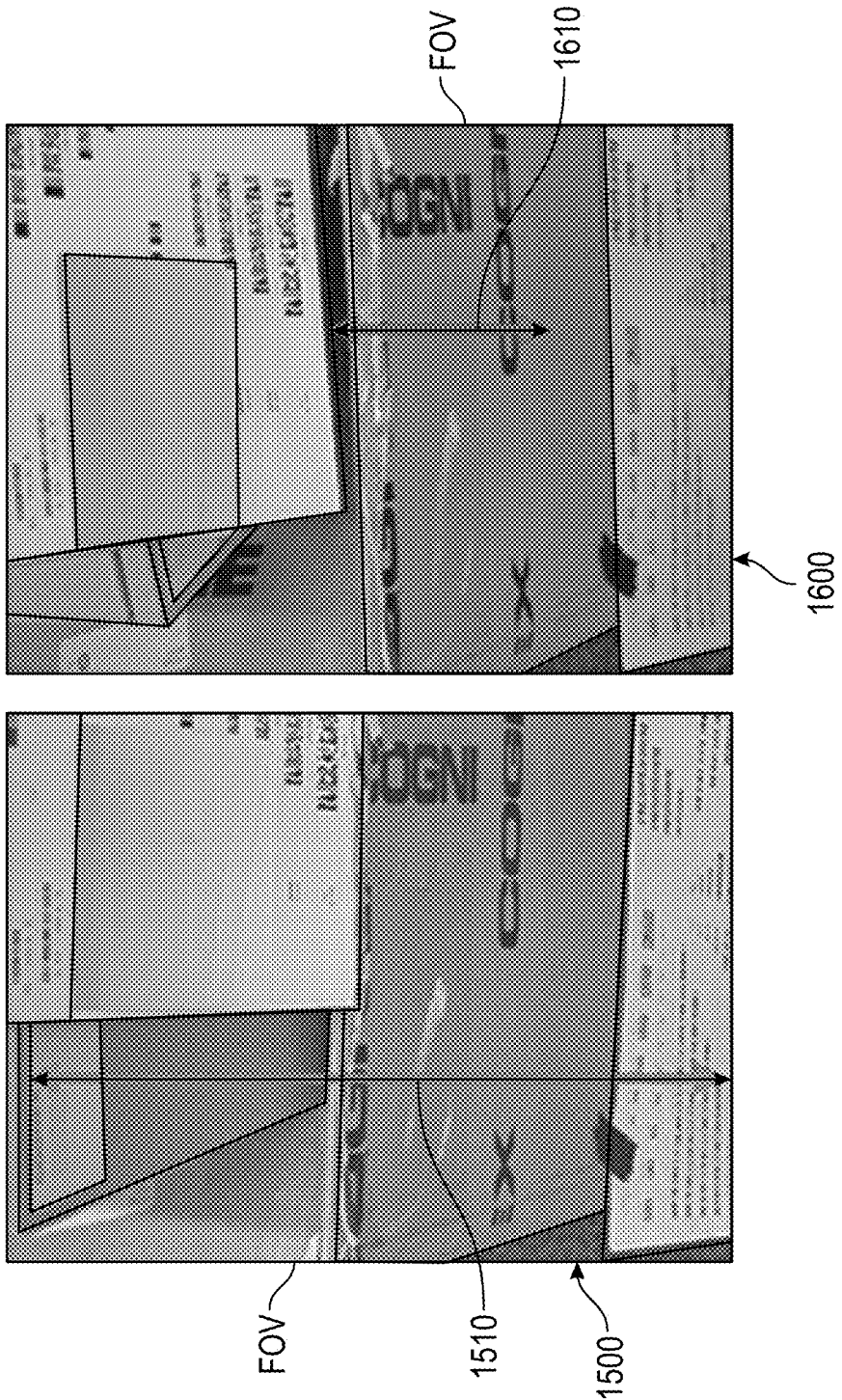

SYSTEM AND METHOD FOR EXTENDING DEPTH OF FIELD FOR 2D VISION SYSTEM CAMERAS IN THE PRESENCE OF MOVING OBJECTS

FIELD OF THE INVENTION

This invention relates to machine vision system cameras, and more particularly to cameras having automatic adjustment optical mechanisms for use in (e.g.) finding and decoding ID codes on objects.

BACKGROUND OF THE INVENTION

Vision systems that perform measurement, inspection, alignment of objects and/or decoding of symbology in the form of machine-readable symbols (also termed "IDs", such as a 2D matrix symbol) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, an ID reader typically functions to illuminate the scene containing one or more IDs. The illuminated scene is then acquired by an image sensor within the imaging system through optics. The array sensor pixels is exposed, and the electronic value(s) generated for each pixel by the exposure is/are stored in an array of memory cells that can be termed the "image" of the scene. In the context of an ID-reading application, the scene includes an object of interest that has one or more IDs of appropriate dimensions and type. The ID(s) are part of the stored image.

A common use for ID readers is to track and sort objects moving along a line (e.g. a conveyor) in manufacturing and logistics operations. The ID reader, or more typically, a plurality (constellation) of readers, can be positioned over the line at an appropriate viewing angle(s) to acquire any expected IDs on the face(s) of respective objects as they each move through the field of view. Generally, the focal distance of the ID reader with respect to the object can vary, depending on the placement of the reader with respect to the line and the size of the object.

Typical ID readers operate to acquire 2D images of the object, which can contain multiple sides, with ID codes printed at differing heights and/or orientations (box sides) on the object. It can be challenging for the image sensor to focus in on the complete working range of the (typically moving) object in which an ID code may be located—particularly where the optical axis of the camera assembly is oriented at a tilted (non-perpendicular) orientation with respect to one or more object sides. To ensure that the working range is appropriately focused, the depth of field (DOF) of the camera optics should be maximized. In a specific logistics example, it is desirable to be able to accurately image sides of objects (boxes) that define a height of approximately 800 millimeters and the minimum distance box-to-box 200 millimeters on a conveyor travelling at (e.g.) up to approximately 3 m/s.

SUMMARY OF THE INVENTION

This invention overcomes disadvantages of the prior art by providing a system and method that can be advantageously used in (e.g.) logistics applications, scanning for features and ID codes on objects (boxes), as well as other vision system tasks requiring an enhanced DOF. The system and method herein allows the maximum size of box to be placed in focus in order to minimize both the number of cameras imaging same size of the box and the complexity of the system. To enhance DOF, the system and method effectively combines a vision system, a glass lens designed for both regular (on-axis) and Scheimpflug (or other appropriate) configurations, a variable (e.g. liquid) lens and a mechanical system to adapt the lens to the different configurations without (free of) screwing-out (or otherwise detaching) the optics and associated mechanics. In an exemplary implementation, the optics can be steerable, which allows it to adjust between variable angles so as to optimize the viewing angle to optimize DOF for the object in a (e.g.) Scheimpflug configuration. One, or a plurality, of images can be acquired of the object at one, or differing, angle settings, so that the entire region of interest is clearly and accurately imaged. In another exemplary implementation, the optical path can include a steerable (one-axis or two-axis) mirror and (optionally) a folding mirror overlying the region of interest. The steerable mirror allows different locations on the box to be scanned and multiple images to be acquired—each providing a clear image of at least a portion of the overall region of interest.

In an illustrative embodiment, a system and method for maximizing depth of field (DOF) with respect to an object imaged by a vision system camera can be provided. The image sensor can transmit image data to a vision system processor. The image sensor can also define a system optical axis. A lens assembly can be arranged to provide a high DOF and low drift, and the lens assembly can define a lens optical axis. A variable lens can be arranged between the lens assembly, and the image sensor the at changes focus in response to the processor. A tilting mechanism can be arranged to vary the lens optical axis relative to the system optical axis in response to focus information in the processor so as to maximize DOF. The tilting mechanism is constructed and arranged to (a) vary a relative angle of the lens assembly or (b) vary a relative angle of a steerable mirror located between the lens assembly and the object. A folding mirror can be located between the steerable mirror and the object. The tilting mechanism can operate on each of two orthogonal axes. The variable lens can comprise a liquid lens (for example, a membrane-based liquid lens). The lens assembly can comprise a stack of solid or glass lenses mounted in a tilting mount with respect to a housing containing the image sensor, and/or the liquid lens can be mounted in the tilting mount. The lens assembly, variable lens and the image sensor can define an optical path with respect to the object. The optical path can be variable between (a) an on-axis and (b) another (non-on-axis) configuration in which an optical plane of the lens assembly is non-parallel with an image plane relative to the image sensor. The configuration can comprises a Scheimpflug configuration, or any other acceptable configuration that enhances DOF, and/or another desired imaging characteristic. In general, the processor can be arranged to find and decode 1-dimensional and 2-dimensional ID codes in the image. Illustratively, the object can move through a field of view (FOV) of the vision system camera in a logistics operation.

In an illustrative embodiment, a system and method for maximizing depth of field (DOF) with respect to an object imaged by a vision system camera, by projecting light from the object onto the image sensor along an optical path, and through a lens assembly of solid or glass lenses and a variable lens responsive to an image processor can be provided. In such a system and method, the optical path can be moved to a prevailing angle by a mechanical system that varies the optical path. The system and method can determine a distance between the object and an image plane of the vision system camera based upon constraints that can comprise (a) a speed of motion of the object, (b) a maximum size of the object, (c) and/or a minimum distance between the object and another adjacent object moving at the speed of motion. The prevailing angle of the optical path can be determined with respect to the image plane. The variable lens can be set to focus the projected light with respect to a plane of interest on the object. An image can then be acquired with the vision system camera. Illustratively, the mechanical system can vary an angle the optical path by tilting the lens assembly with respect to the housing, and/or the mechanical system can vary the angle of a steerable mirror located between the lens assembly and the object. A desired DOF can be set by tilting the optical path and adjusting a focus of the variable lens. By way of example, the variable lens can be a liquid lens. The illustrative system and method can operate to find and decode at least one 1-dimensional or 2-dimensional ID code on the object, and/or direct the object in motion through a field of view (FOV) of the vision system camera. The system and method can further operate to direct another object, adjacent to the object, in motion through the FOV and acquire an image of each of the object and the other object. The lens assembly, variable lens and the image sensor of the system and method can define an optical path with respect to the object. As such, the optical path can be variable between (a) an on-axis optical path and (b) another (non-on-axis) configuration in which an optical plane of the lens assembly is non-parallel with the image plane. This non-on-axis configuration can comprise a Scheimpflug configuration, or other appropriate configurations that enhance DOF and/or another imaging characteristic. Additionally, the system and method can operate to find and decode 1-dimensional and 2-dimensional ID codes in the image with a vision system processor.

BRIEF DESCRIPTION OF THE DRAWINGS

The invention description below refers to the accompanying drawings, of which:

FIG. 15 is a diagram of an image showing objects within an FOV, defining an expanded DOF acquired using the principles of the system and method herein; and FIG. 16 is a diagram of a comparative image of the same objects and FOV of FIG. 15, defining a limited region of focused detail using a conventional optics arrangement.

DETAILED DESCRIPTION

I. System Overview

Figure 1:
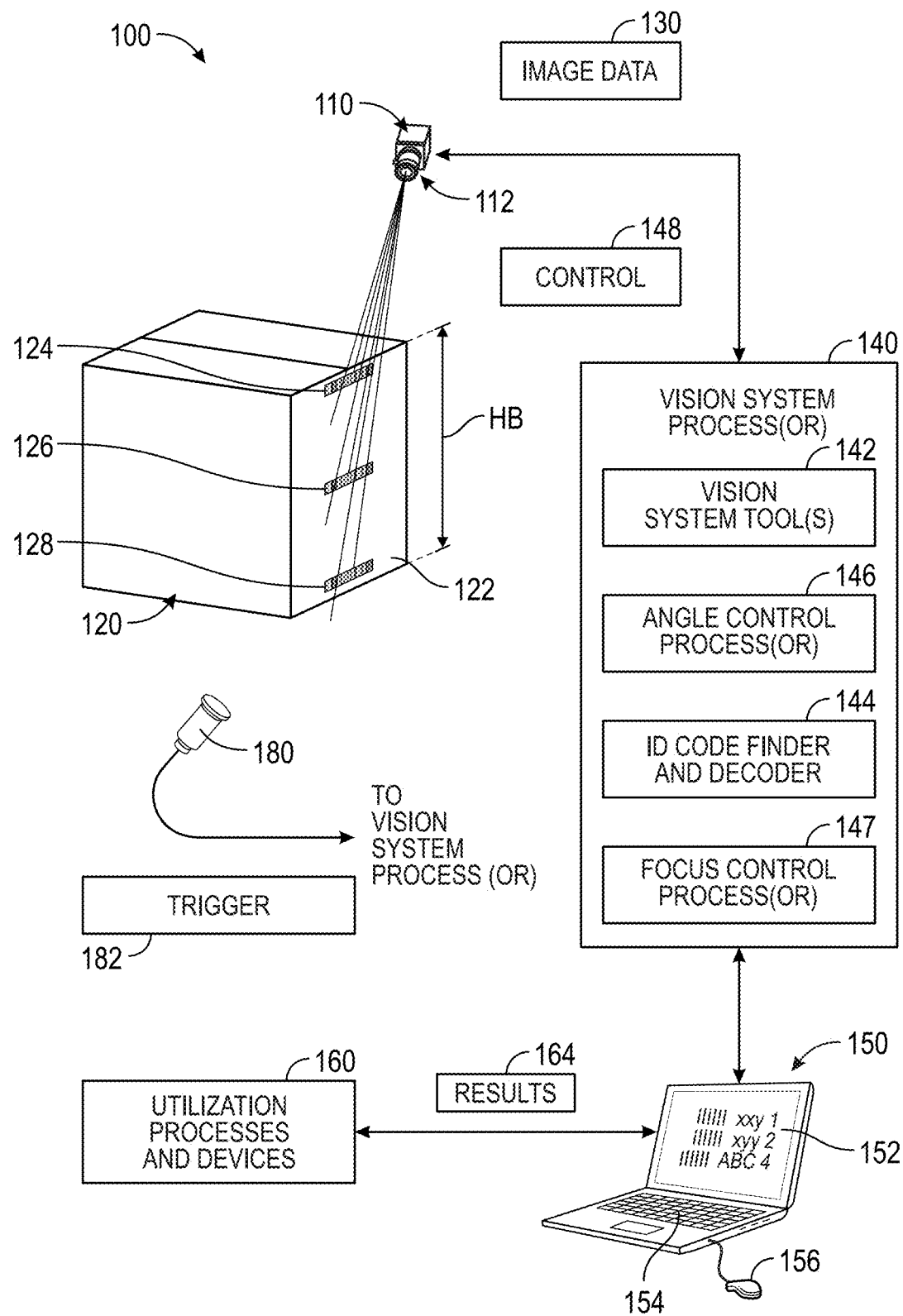
FIG. 1 is a diagram showing a vision system used, for example, in logistics operations with a camera assembly acquiring an image of the side of an exemplary object (box) with a plurality of ID codes positioned at varying heights along its side face, wherein an extended depth of field (DOF) optics arrangement allows for improved acquisition of image data associated therewith.

FIG. 1 shows a vision system arrangement 100 for use in providing an enhanced depth of field (DOF) useful in imaging detailed features, such as ID codes located on imaged object surfaces over a relatively large distance. The arrangement 100 includes a imaging system (also herein termed a "camera assembly") 110 with a corresponding optics package 112 that directs received light from the surface of the depicted, exemplary object a box) 120 onto the surface of a sensor S (described below in FIG. 2). As shown, the camera assembly is directed to acquire an image of the side 122 of the box 120, where it is desired to acquire and decode various ID codes 124, 126 and 128 along the box height HB. The variation in height, in combination with the small and precise details present in the ID codes, can make the task of decoding somewhat challenging. That is, a camera with a conventional DOF may only be able to focus adequately upon one or two ID codes, but not all three codes. Changing focus and acquiring more than one image in a single scene can allow ID codes at differing distances to be acquired. However, this approach can also be disadvantageous where objects are moving down a conveyor line (e.g. in a logistics situation), and rapid imaging at an inspection station is desired.

The illustrative camera assembly 110, as described further below, therefore incorporates a tiling optics package 112 that can vary its angular orientation during imaging to allow for increased DOF. The camera assembly 110 image sensor (S in FIG. 2) is typically 2D grayscale or color pixel arrays but can be a 1D array in various embodiments, and is interconnected with a vision system process(or) 140. Image data 130 is transmitted to the process(or) 140 from the camera assembly 110. The process(or) 140 can be contained completely or partially within the housing of the vision system camera arrangement 110. The processor 140 carries out various vision system processes using image data transmitted from the image sensor. The process(or) 140 can include, but is not limited to, vison tools 142, such as edge detectors, segmenting tools, blob analyzers, caliper tools, pattern recognition tools, and other useful modules. The vision system process(or) 140 can also include an ID finder and decoder 144, according to a conventional or custom arrangement, which data from vision system tools and determines whether ID candidates are present in the analyzed image(s). The ID decoder function can then employ conventional functional modules, as well as custom processors/processes, to attempt to decode found ID candidates within the image.

Other processes and/or modules can provide various control functions—for example, auto-focus, illumination, image acquisition triggering, etc. Such functions should be clear to those of skill. Notably, an angle or tilt control process(or) 146 is provided. As described below, this function serves to vary the tilt of the glass portion of the optics 112 (or another optical component, such as a mirror, prism, etc.) so as to allow for increased DOF according to the exemplary embodiment. Appropriate control data/signals 148 can be transmitted from the process(or) module 146 to the drive mechanism (described below) for the optics 112. Additionally, a focus control process(or) 147 can provide focus information to a variable (e.g. liquid) lens assembly within the optics 112 of the camera assembly as described further below as part of the control signal information 148.

Alternatively, some or all of the vision system process(or) 140 can be contained within a general purpose computing device 150, such as a PC, server, laptop, tablet or handheld device (e.g. smartphone), which can include a display and/or touchscreen 152 and/or other forms of conventional or custom user interface, such as a keyboard 154, mouse 156, etc. It should be clear that a variety of processor arrangements and implementations can be employed to provide vision system functionality to the arrangement 100 in alternate embodiments. Similarly, where the camera arrangement is used for tasks other that ID decoding, appropriate vision system process modules can be employed—for example, where the vision system is used for inspection, a training process module and trained pattern data can be provided.

The computing device 150 and/or process(or) 140 is shown linked to one or more data utilization processes and/or devices 160. Results 164 from ID-decoding and/or other vision system tasks, are delivered to such downstream components, and used to perform (e.g.) logistics operations—for example package sorting, routing, rejection, etc.

By way of non-limiting example, note that a photo detector, or other presence sensing device 180, can be located at an appropriate position along the flow of objects (e.g. conveyor line) to issue a trigger signal 182, that is used by the vision system process(or) 140 to begin image acquisition of the object 120. The detector can also signal when the object has left the inspection area, and awaits arrival of a new object to begin a new round of image acquisition.

Figure 2:
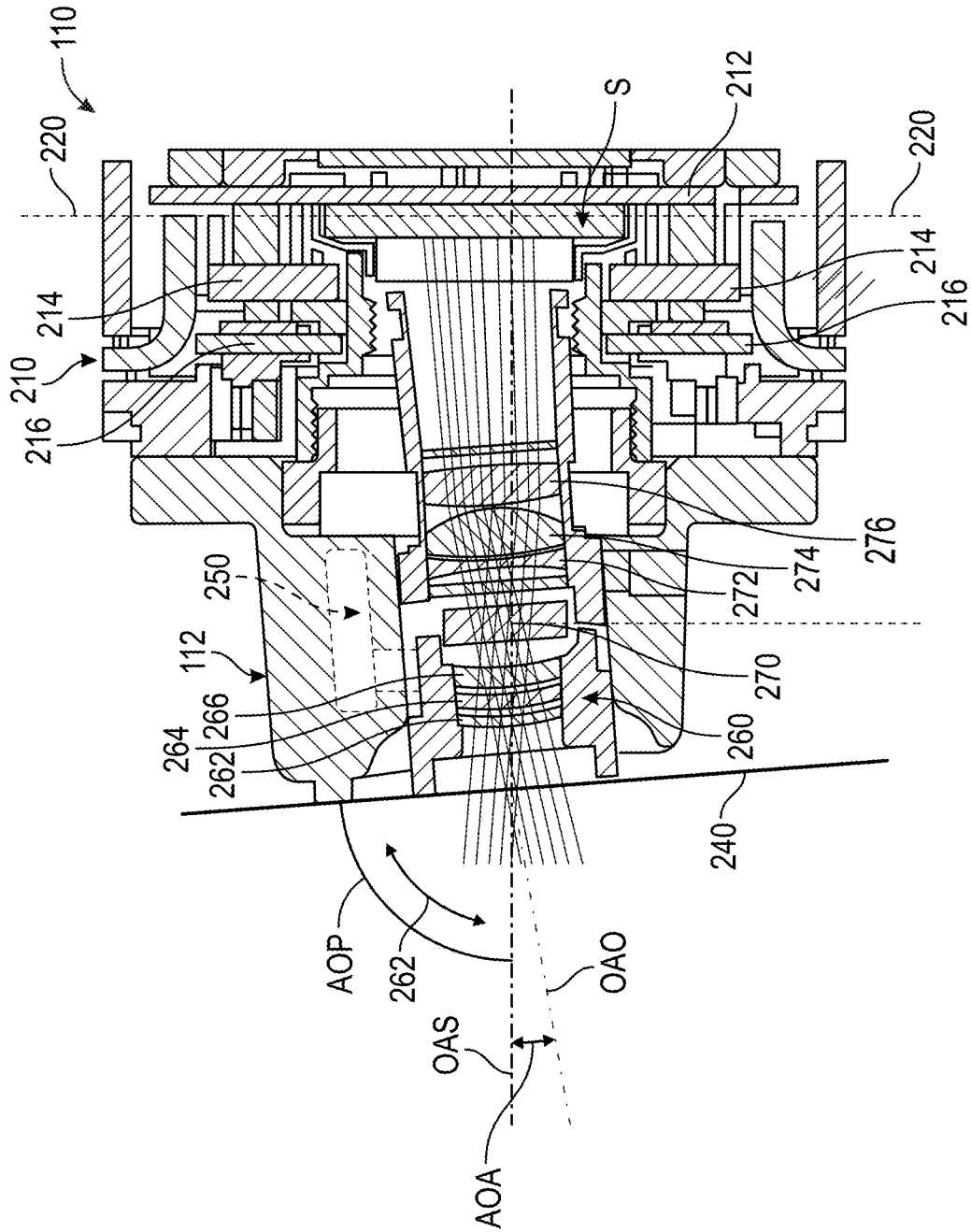
FIG. 2 is a cross section side view of a generalized camera assembly with optics package and image sensor having a variable tilt mechanism for use with the front, glass lens assembly of the optics according to an exemplary embodiment.
Figure 3:
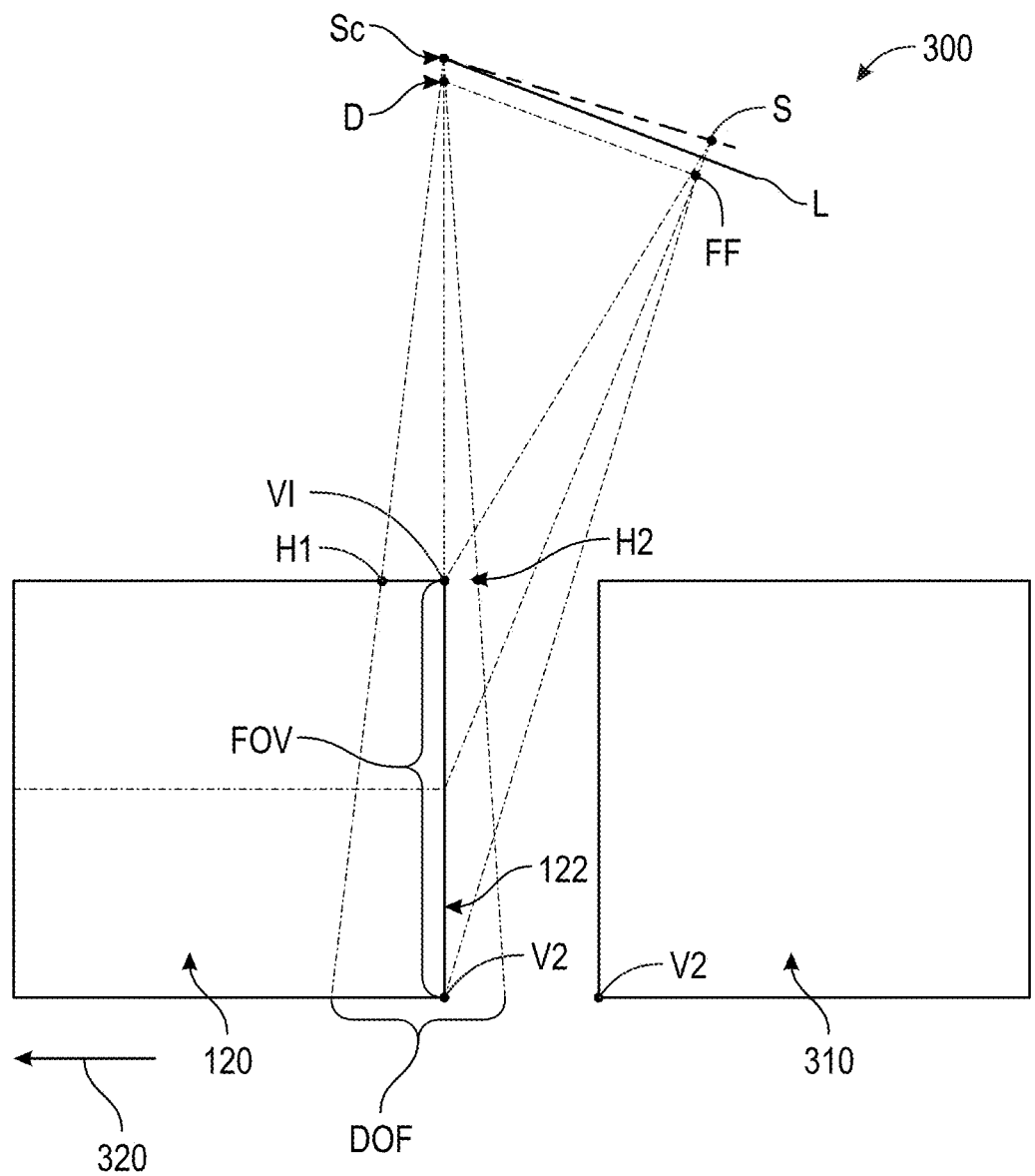
FIG. 3 is diagram showing the operation of the (e.g.) Scheimpflug principle to image a side of an exemplary object (box) using a variable tilt mechanism to acquire a plurality of images of the side with desired DOF according to an illustrative embodiment.

With further reference to FIG. 2, an exemplary implementation of the camera assembly 110 is shown in further detail. The depicted camera assembly, defines a housing 210 having a plurality of circuit components (boards, chips, etc.) 214, 216, 218, including a main board 212 carrying an image sensor S as described above. The sensor S defines an image plane 220, onto which a focused image of the object 120 is projected by the optics 112, and converted into pixel data for processing by the vision system. The sensor S defines a system optical axis OAS, which extends perpendicularly from the sensor image plane 220. The optics defines and image plane 240 that is oriented at a non-perpendicular angle AOP with respect to the system optical axis OAS, and the associated optics optical axis OAO is arranged at an acute (non-parallel) angle AOA with respect to the system axis OAS. This angle AOA can vary, in part, based upon an adjustment mechanism 250 that changes the tilt of at least a portion of the optics assembly 112. In a non-limiting example, the angle AOA is between approximately 5 and 20 degrees. The varying-tilt portion of the optics 112, in this exemplary embodiment, is the so-called glass lens 260 at the front-most part of the overall optics assembly 112. As shown, the glass lens 260, which can be removable, consists of a plurality of (e.g.) convex and concave lenses 262, 264 and 266 arranged according to known optical principles to achieve a given focal distance, etc. Behind the variably tilting (double-curved arrow 262) glass lens 260 is a variable-focus lens assembly 270. This variable-focus lens assembly 270 can be electronically controlled based upon control signals 148 from the process(or) 140. The varying component can be a mechanical or liquid lens, such as those available from Optotune of Switzerland and Varioptic of France. In such arrangements, the liquid lens 270 can be controlled using any appropriate focus data (for example, detecting sharpness with vision tools, use of range finders, including LIDAR, time-of-flight sensors, etc.) to provide inputs 118 that direct the proper focal distance. Such information is handled via the focus control processor 147 (FIG. 1) in a manner clear to those of skill. More particularly, lens focus can be controlled by the vision system processor 140, described above, or by a separate focus processor—or a combination of operatively connected process components. The variable lens assembly 270 can be oriented a fixed-angle tilt and includes a set of rear concave and convex lenses 272, 274 and 276. The overall lens arrangement is appropriate to provide a generally desirable focus distance and DOF for the task. Reference is made to commonly assigned U.S. patent application Ser. No. 15/847,868, entitled SYSTEM AND METHOD FOR REDUCTION OF DRIFT IN A VISION SYSTEM VARIABLE LENS, filed Dec. 19, 2017, which describes various optics arrangements (e.g. lens stacks) for providing extended DOF in the presence of a variable lens, the teachings of which are incorporated herein by reference as useful background information. The optics 112 can use the depicted variable focus lens 270 to provide an auto-focus functionality that allows operation within a predetermined focal range.

The tilted optics 112 relative to the sensor image plane 220 generally operates according to the Scheimpflug principle (refer also to above-incorporated U.S. patent application Ser. No. 15/847,868 for description) with respect to points on the object surface 130 where the optics axis OAO and system, optical axis OAS converge. The resulting vision system arrangement 100 affords a DOF when imaging features with smaller details (e.g. barcodes 124, 126, 128) across a range of distances as shown along the side of the 112 of the exemplary box 120. That is, object (box 120) is entirely focused on the FOV of the camera assembly 110. An illustration of the use of the Scheimpflug principle is depicted in the diagram 300. In this example, a (e.g.) 3MP image sensor S of a type used herein, with (e.g.) 9 millimeters of full diagonal size, works together with a lens L of (e.g.) 35 millimeters, and an aperture setting of F8. The three planes described by the sensor S, the lens L and the vertical front side 122 of the object/box 120 (defining vertical distance V1-V2) meet on the Scheimpflug point Sc. This particular configuration allows the system to image a box of (e.g.) 800 millimeters of height (V1-V2) distance having a box gap of 300 millimeters (V2-V3) with respect to an adjacent box 310. Note that the Scheimpflug configuration, as described herein, is one of a variety of arrangements that can be achieved by the (variable) geometry of the lend arrangement herein. It is contemplated that other appropriate configurations that enhance DOF can be employed, including generally those that vary the optical path between an on-axis and another (typically non-on-axis) configuration in which the optical plane of the lens assembly is non-parallel with the image plane relative to the image sensor. The use of such alternate non-on-axis configurations should be clear to those of skill in the art of optical arrangements.

The DOF is defined by the intersection between the lines defined by the front focal lens plane FF and the front side of the box defined by (distance V1-V2). The DOF presents a wedge shape with the vertex placed at the point D. The minimum DOF of interest for this case is determined by the points (H1-H2); and in that case, the DOF for the maximum height of the box is 170 mm. Assuming a frame rate of 20 ms of reading-out time for the camera sensor S, and 4 mm/ms box travelling speed (arrow 320) through the FOV (e.g. using a conveyor), the number of frames that the camera sensor Scan acquire with the entire side of the box in acceptable focus is calculated as follows:

$$\#\text{frames} = \frac{DOF_{min}(\text{max box height})}{\text{frame rate (ms)} * \text{conveyor speed}\left(\frac{mm}{ms}\right)} = \frac{170\ mm}{20\ ms/\text{frame} * \frac{4\ mm}{ms}} = 2.125 = 2\ \text{frames}$$

Thus, if the entire range of the box side can be imaged using 2 frames, then an accurate and reliable read of all potential candidate features on the box can be acquired and (where applicable) decoded to obtain useful results. Acquisition of the entire surface can be achieved using a can be achieved using a variable tilting (steerable) optics system in combination with a variable focus (e.g. liquid) lens assembly.

II. Steerable Lens

Figure 4:
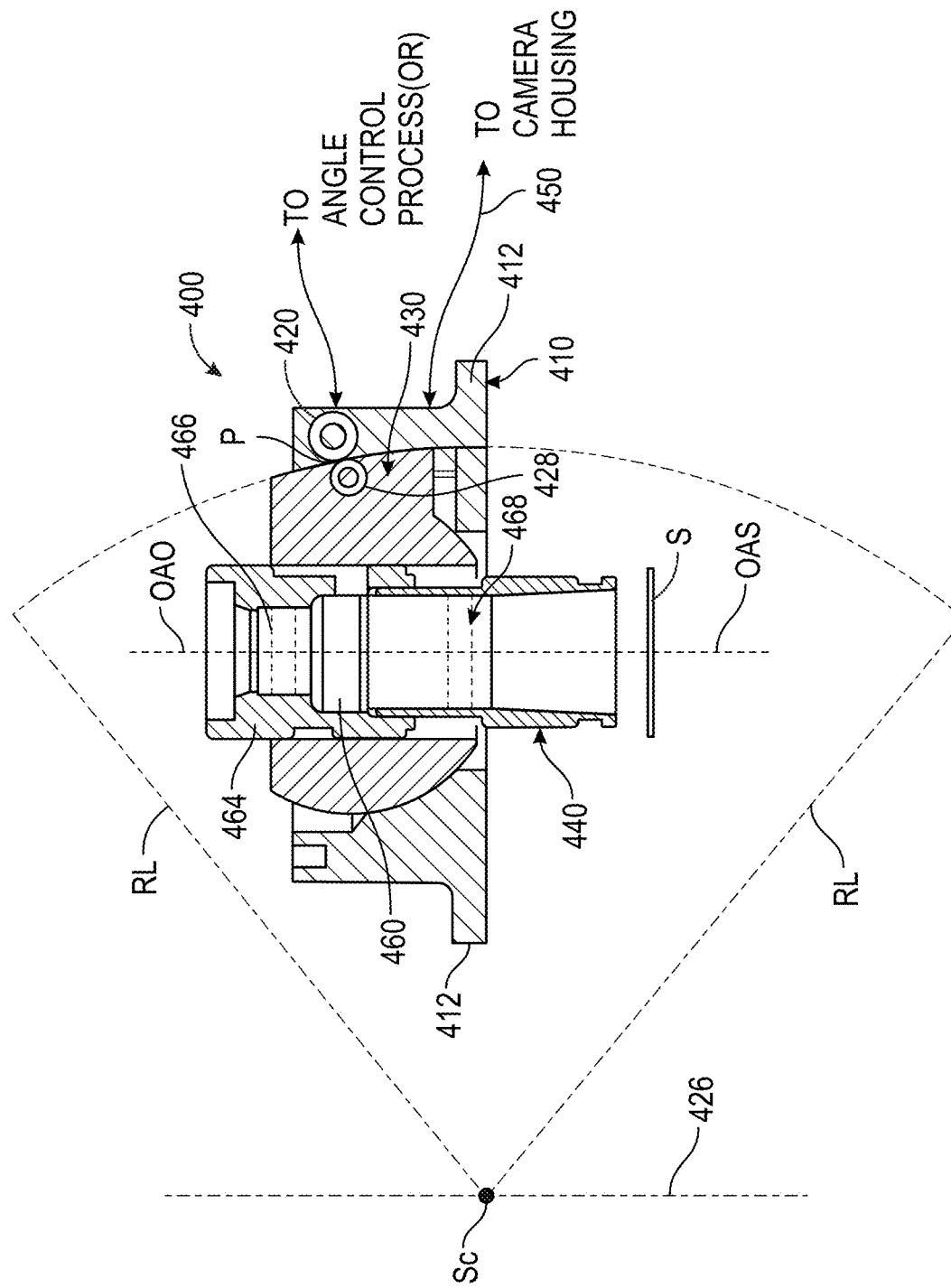
FIG. 4 is a side cross section of an exemplary variable-angle, tilting lens assembly and actuator for use with the vison system camera assembly according to an illustrative embodiment.

Reference is made to FIG. 4, which shows a variable-tilt (steerable) lens assembly 400, which can be integrated with the overall optics (112) described above. The lens assembly 400 includes a housing 410 that can be attached to a camera assembly lens mount (for example a C-mount) via mating threads or another attachment technique (e.g. set screws, etc.). Alternatively, the housing 410 can be attached to the front face of the camera housing via screws or other fasteners using a flange (412). The housing includes a geared motor 420 that receives power and control signals from the angle control process(or) (146 in FIG. 1) through any appropriate motor control circuit and/or interface. The motor drives a yoke 430 that rotates about the depicted axis of rotation Sc to generate a non-perpendicular tilt in the axis OAO of a lens assembly 440 with respect to the image plane of the sensor S (non-parallel with the sensor system axis). The motion of the tilt is defined by the radius RL between the rotation axis Sc and the contact point P between the motor 420 with the yoke 430. The rotation axis Sc can define orthogonal exes—for example perpendicular to the page as depicted and vertically (line 426). Hence the yoke 430 can be arranged to move about each of two orthogonal axes under the drive of the motor and/or a second motor 428. The yoke 430 and confronting surface of the lens housing 410 can define hemispheres in a two-axis arrangement that allow for free movement in the manner of a ball and socket within a range of tilt angles relative to each side of the system axis. In this manner, the camera can rotate about a given axis regardless the camera housing's spatial orientation with respect to the object.

The yoke 430 and motor(s) 420 (and 428) can interact in a variety of ways to achieve an adjustable tilt angle—for example, the yoke 430 can contain a gear rack driven by a pinion gear of the motor. The motor can also include a worm drive gear interacting with a yoke-mounted rack. Alternatively, the motor can drive an elastomeric tire that bears against a smooth or textured contact surface on the yoke. In another arrangement, one motor can drive the yoke about a tilt axis, and that entire assembly can be rotated about an orthogonal axis, in the manner of a gimbal, to provide a second degree of freedom. Appropriate feedback can be returned to the angle control process(or) 147 to track angular position of the lens barrel 440 and its associated axis OAO. Such feedback can be generated by tracking motor steps (i.e. where the motor 420 (and 428) is arranged as a stepper motor), or via a discrete encoder that is operatively connected to the motor and yoke drive train. In other embodiments, an accelerometer arrangement can be employed to track relative position. Other techniques for tracking spatial position and orientation of the lens assembly 440. A data/power connection (not shown) between the lens assembly 410 and the camera assembly housing can be provided as appropriate. By way of non-limiting example, this connection can be interengaging contact pads that come into contact when the lens housing 410 is mounted in the camera housing, or a removable cable 450 that extends from the lens housing 410 to a socket (not shown) on the camera housing.

In addition to power and control of the motor 420 the above-described cable 450 can connect the variable (e.g. liquid) lens assembly 460 to the focus control (147 in FIG. 1) on the vision system processor 140. The liquid lens 460 in this example is integrated, and tilts with, the barrel 464 of the overall lens assembly 440. The barrel 464 collectively houses a front glass lens arrangement (stack) 466, the variable/liquid lens 460, and a rear lens arrangement (stack) 468. In alternate arrangements, the glass front lens arrangement can be tilted exclusively, while the liquid lens and/or rear glass lens arrangement remain stationary with respect to the sensor S. In general, the number of glass lenses and their placement in the barrel 464 are highly variable based upon the desired characteristics of the optical system.

In operation, the motor 420 operates to tilt the lens assembly 440 to different orientations about the axis Sc while the focus of the liquid lens 460 is adjusted to the proper focal distance to image each portion of the overall FOV to fully encompass the needed DOF for an entire side of the object. Notably, the focal position of the lens 460 can be adapted with respect to the sensor S for the different uses cases, i.e., focus for a 24-millimeter lens differs from that of a 35-millimeter lens, and the system allows for flexibility to accommodate these physical differences and provide the user options in choosing lens assemblies that are most suited to a given task. More particularly, as the motor 420 tilts the lens, the focus feedback causes the process(or) (147) to adjust to proper focal plane for that tilt setting.

Note that part of the information provided to the processor can include the current angle of the lens with respect to the camera axis. This is used in combination with other information to set the focus of the variable (liquid) lens so as to place the plane of interest on the object in proper focus. The system also determines the distance between the object and the camera image plane. This data is combined with other system/application constraints, including the speed of motion of the object through the FOV, the maximum size of the object, and the minimum distance object-to-object (described further below).

III. Steerable Mirror and Folding Mirror

Figure 5:
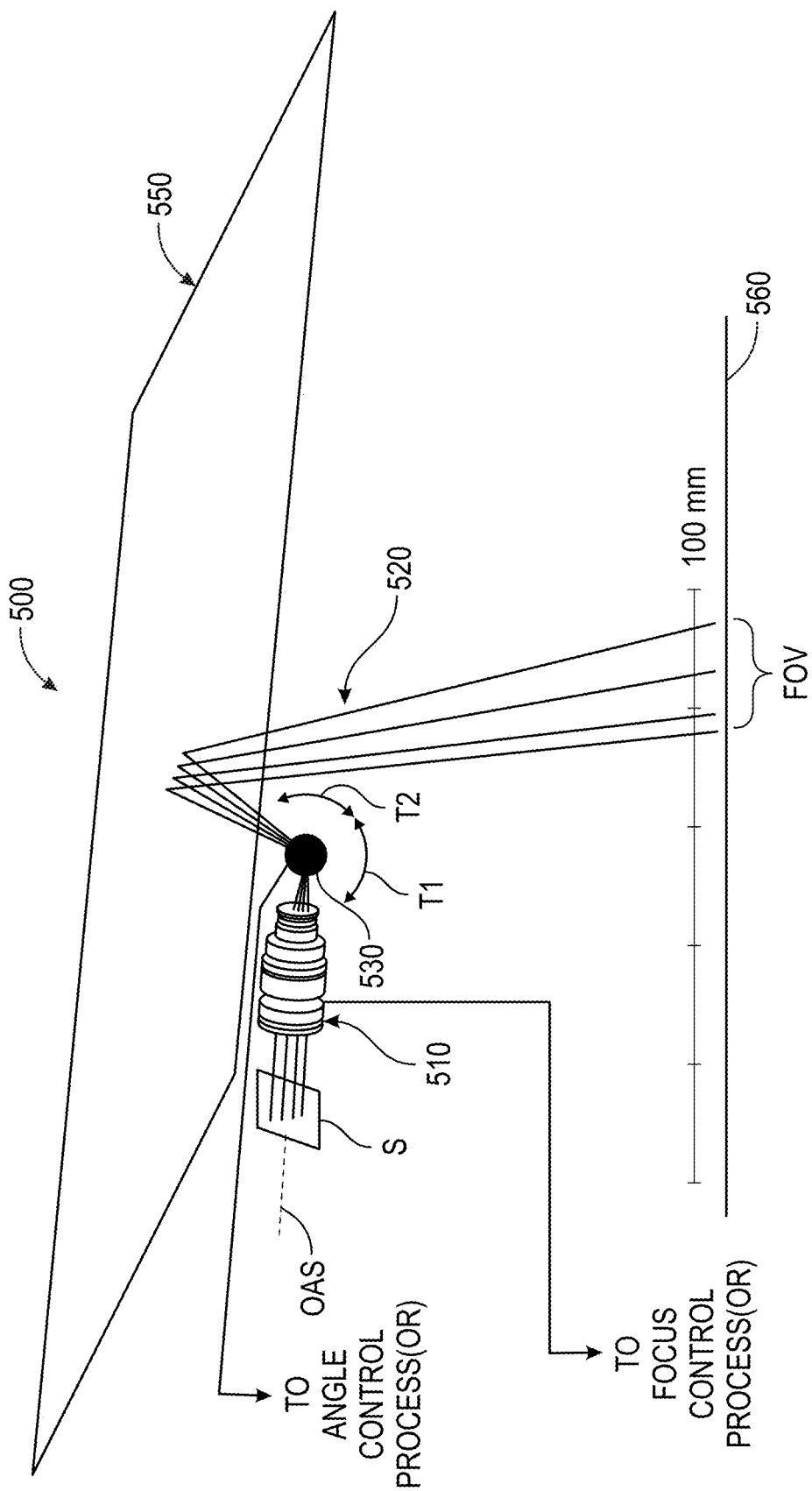
FIG. 5 is a diagram showing a fixed lens assembly and steerable (tilting) mirror that directs the optical path in a sweeping pattern via an overlying folding mirror according to an embodiment.

In an alternate arrangement 500 for providing a variable angle for the lens optical axis (observing the Scheimpflug principle) is shown in FIG. 5. A lens assembly 510 is oriented with respect to the sensor S. The lens assembly 510 can include an appropriate lens stack, including a variable (e.g. liquid) lens, as described above. The variable lens is controlled by the above-described focus control process(or) 147. A steerable mirror 530, sized to reflect the FOV onto the sensor S is positioned in front of the lens assembly 510 along the optical path 520. The overall arrangement defines the above-described Scheimpflug principle. The steerable mirror 530 can be pivoted in one, or two orthogonal, axes (double-curved arrows T1 and T2). The optical path 520 extends onto an overlying, folding mirror 550, which can be mounted at a convenient location with respect to the imaged scene (e.g. the conveyor surface 560).

In operation, the folding mirror 550 is oriented into an appropriate configuration to image the scene, and the steerable mirror 530 tilts (in response to the angle control process(or) 146) along one or both axes to allow the system to scan the different zones of the conveyor, whilst sweeping rapidly across the perpendicular direction of travel. The steerable mirror 530 can be actuated using a variety of techniques (e.g. servos, steppers, voice coils, etc.), which should be clear to those of skill. The steerable mirror 530 can be integrated with the optics of the camera assembly so that it is fully contained and appropriately protected (e.g. using a transparent viewing window) from the environment.

Figure 6:
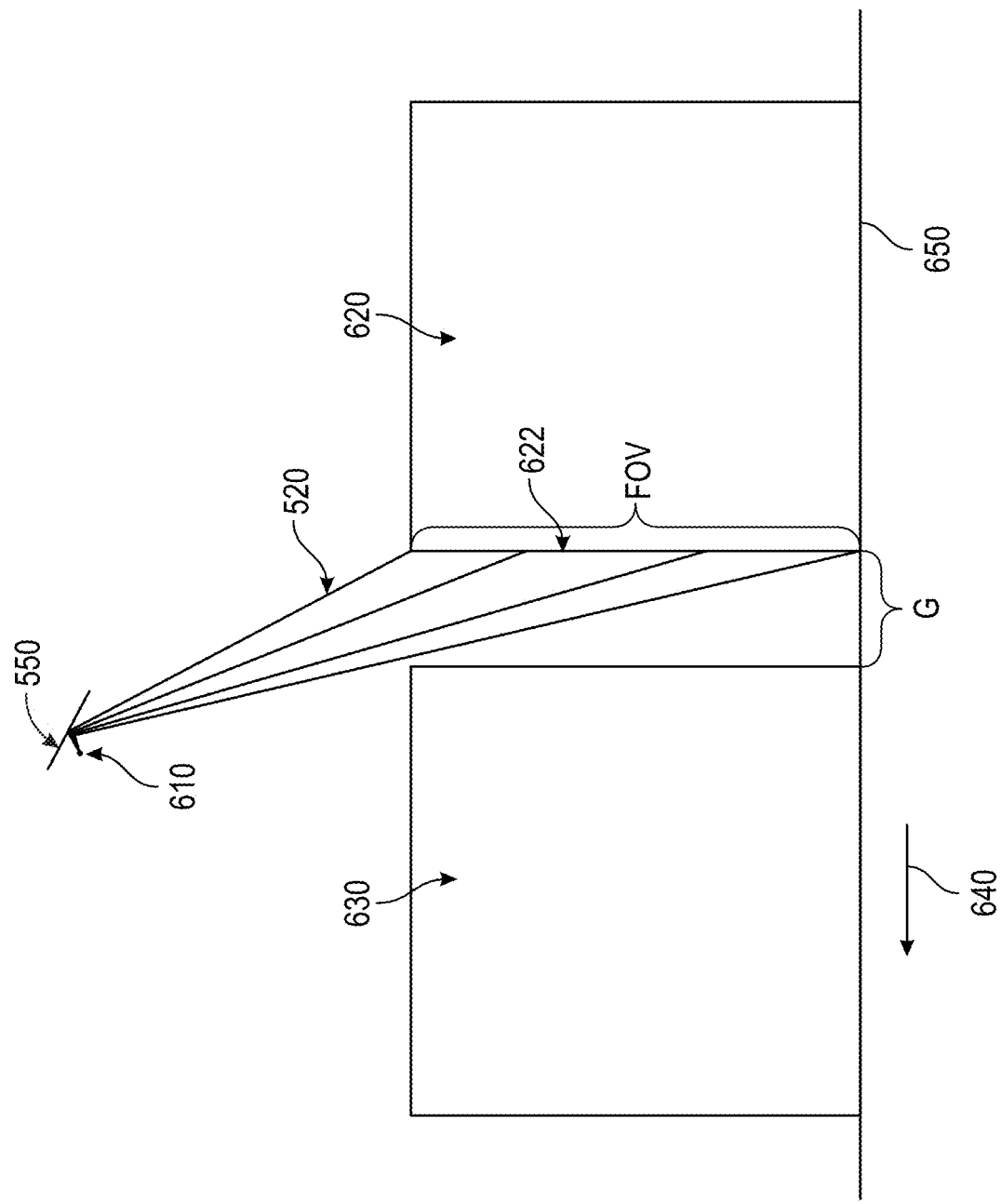
FIG. 6 is a diagram showing the use of the vision system arrangement, with steerable and folding mirrors of FIG. 5, to image a side of an exemplary object (box) within a gap relative to an adjacent box.
Figure 7:
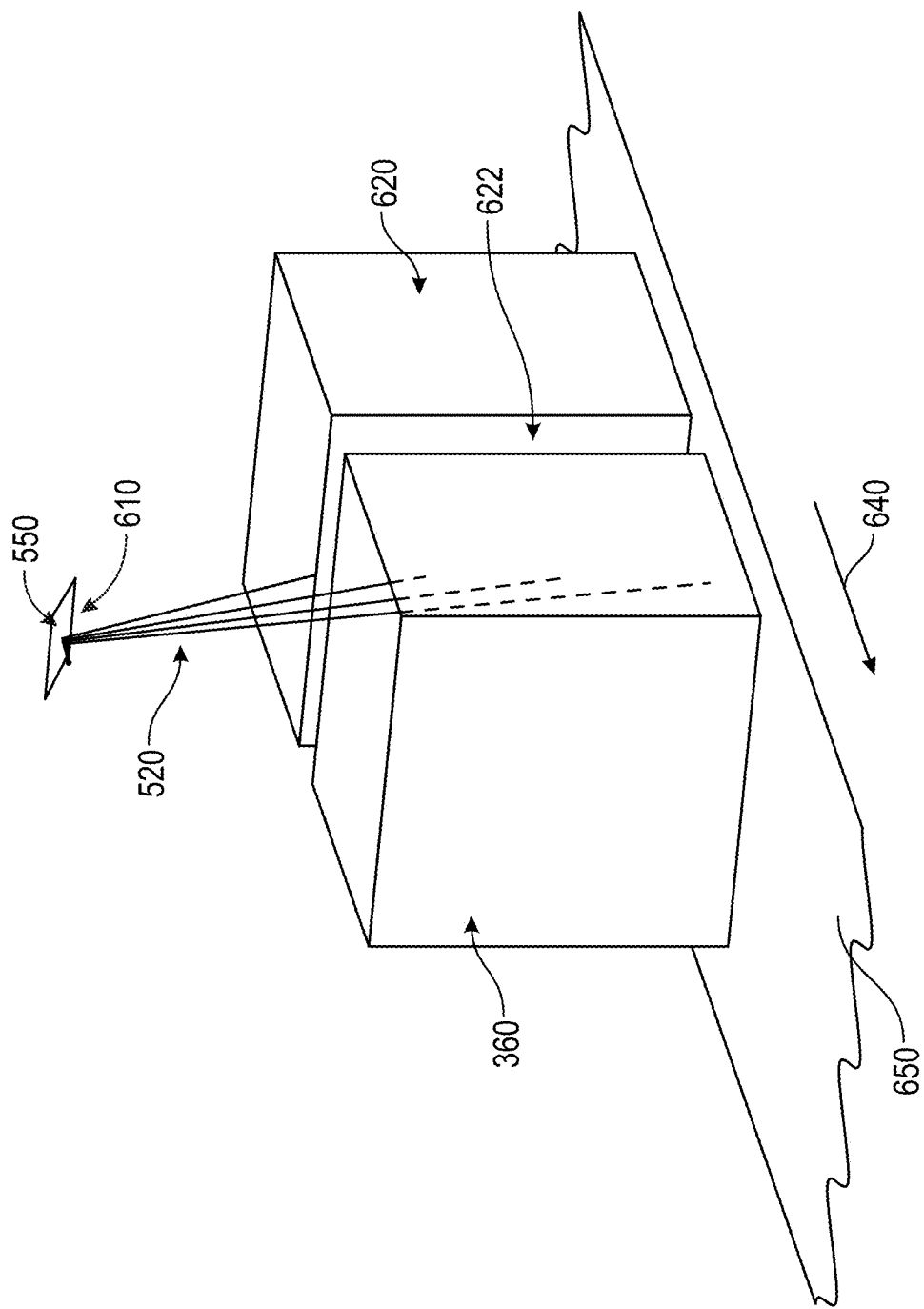
FIG. 7 is a perspective view of the arrangement operating in FIG. 6.
Figure 8:
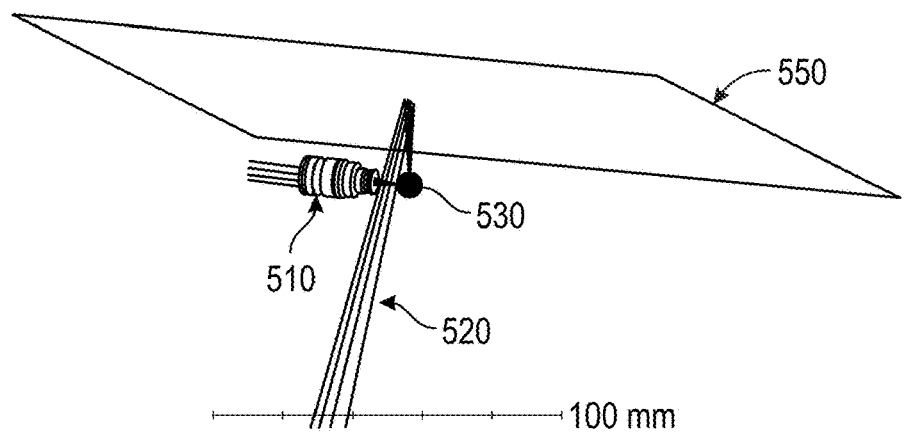
FIG. 8 is a diagram of the vision system, with steerable and folding mirror, of FIG. 5, showing the optical path angled to a left-most, lateral position according to an operational example.

As shown in FIGS. 6 and 7, the optics assembly with steerable mirror 610 (combination of lens 510 and mirror 530 in FIG. 5) is shown in operation to read ID codes (or other features) along the side 622 of on exemplary box 620 located adjacent to a second box 630 in the gap space G between boxes. The imaged scene is defined by the positioning of the folding mirror 550, which is located and angled so as to direct the FOV onto the height of the box side 622. The sweeping motion of the steerable mirror can place various regions of this height (and width) into focus as the box moves (arrow 640) at a predetermined speed down a conveyor line 650. Sufficient frames are acquired of the box during the scan motion of the optical path 520 to ensure all features along the side 622 are sufficiently imaged for decoding. In an example (described above), the boxes have a maximum dimension of approximately 800×800×800 millimeters, but this maximum size (in some or all dimensions) is highly variable in alternate implementations. More particularly, this arrangement is well suited to applications in logistics. In such applications, the maximum height of the boxes is approximately 800 millimeters, and the minimum gap distance, box-to-box is 200 millimeters. The boxes can travel up to 3 m/s through the system's FOV. The system desirably allows for the maximum expected size of the box to be placed in focus, whereby the number of cameras are minimized and the minimizing both, the number of cameras, and complexity, of the system can be minimized.

Figure 9:
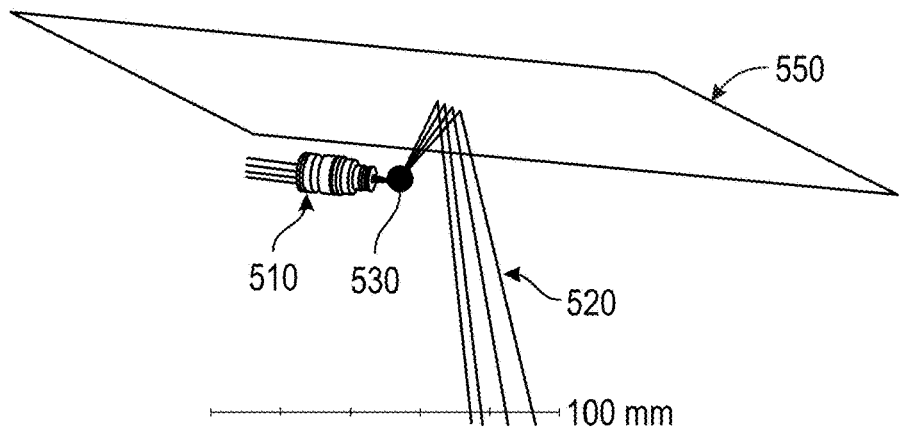
FIG. 9 is a diagram of the vision system, with steerable and folding mirror, of FIG. 5, showing the optical path in a centered position according to an operational example.
Figure 10:
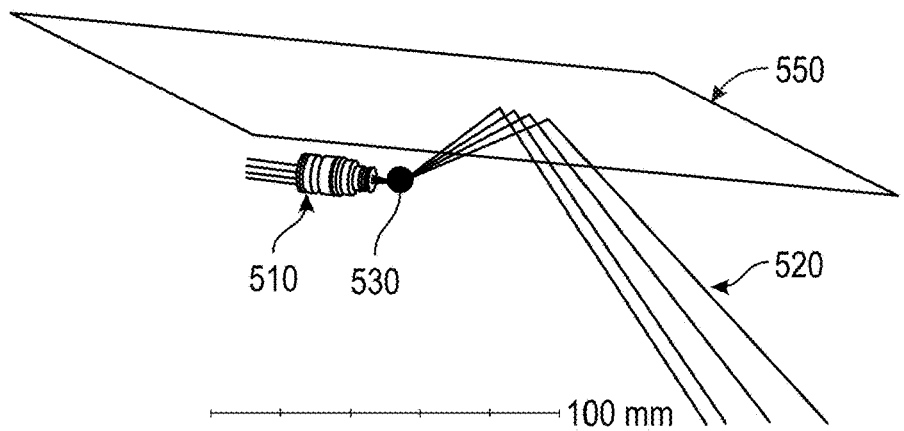
FIG. 10 is a diagram of the vision system, with steerable and folding mirror, of FIG. 5, showing the optical path angled to a right-most, lateral position according to an operational example.
Figure 11:
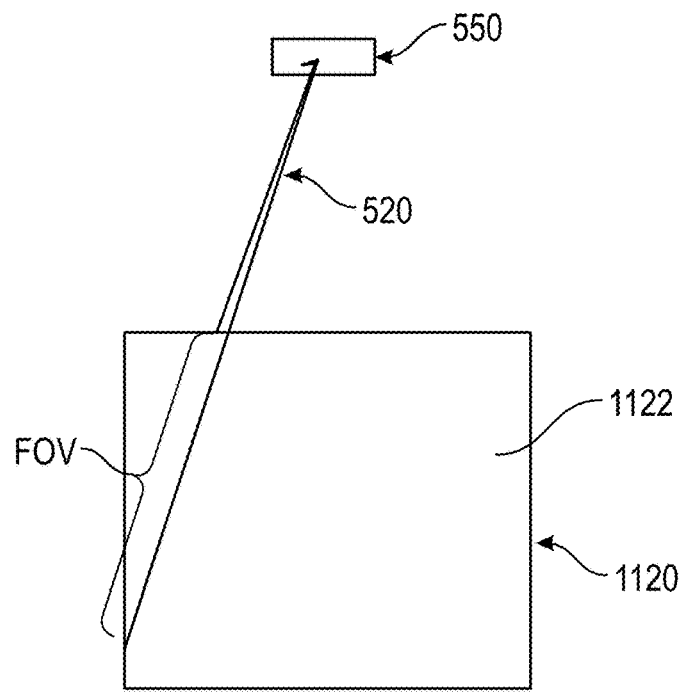
FIG. 11 is a diagram showing the operational example of FIG. 8 with the optical path intersecting an exemplary box side along the left-most portion thereof.
Figure 12:
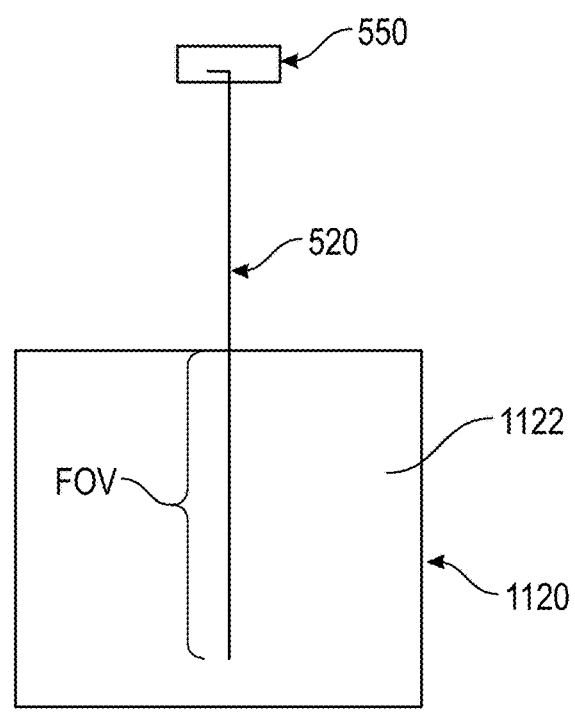
FIG. 12 is a diagram showing the operational example of FIG. 9 with the optical path intersecting an exemplary box side in centered orientation.
Figure 13:
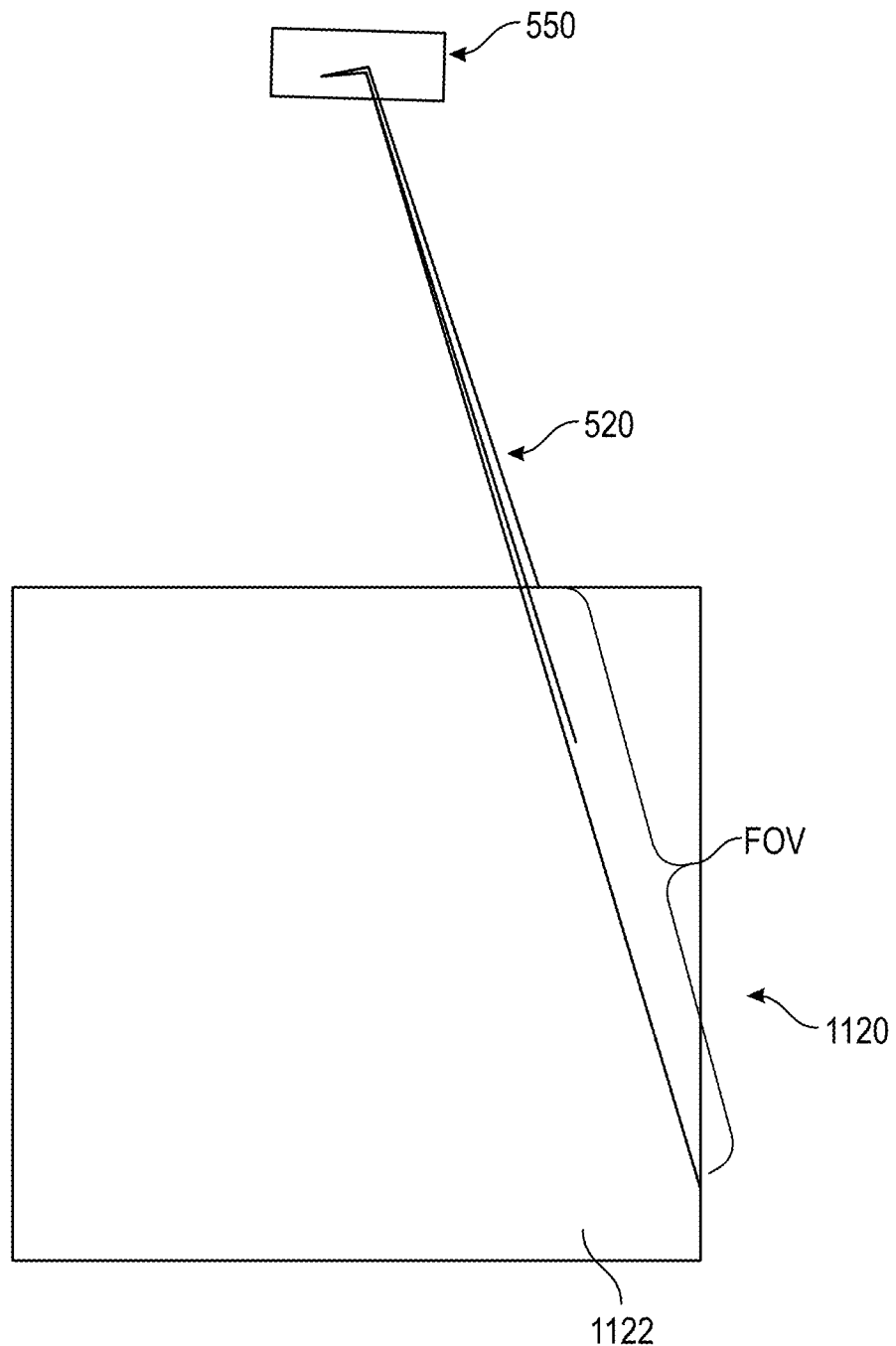
FIG. 13 is a diagram showing the operational example of FIG. 10 with the optical path intersecting an exemplary box side along the right-most portion thereof.

As shown further in FIGS. 8-13, the steerable mirror 530 is angled variously (e.g. a left, center and right position) so that the optical path 520 is redirected laterally so that the associated FOV can cover the entire longitudinal (width) dimension of an exemplary object (box 1120) side 1122. This is accomplished in three discrete positions (and image frames) in the depicted example, but more or fewer lateral positions (for example a left-centered and right-centered position) can be employed in alternate implementations. As shown, the optical path 520 is directed approximately 8 degrees laterally leftward by the steerable mirror 530 in FIGS. 8 and 11, thereby covering the left portion of the box side 1122 along its approximate height, as an image frame is acquired. In FIGS. 9 and 12, the central portion of the box side 1122 is imaged, with the optical path 520 at approximately 0 degrees (neutral) in position. Then, in FIGS. 10 and 13, the optical path 520 is directed laterally rightward so as to image the right portion of the box side 1122. With appropriate overlap the three images generated by this scan process ensure that the entire side is fully imaged with sufficient detail to find and decode minimally size ID code ID features. Note that the use of a +/−8-degree tilt angle is exemplary, and a wide range of possible angles can be employed based upon the prevailing FOV and DOF of the system, size of features to be imaged and size of the overall object under inspection.

IV. Operational Results

Advantageously, the exemplary implementation maximizes the image quality and focus, while extending the DOF. The glass lens component can advantageously operate in both a regular mode, in which its optical axis perpendicular to the sensor plane and in a Scheimpflug configuration, allowing for substantial flexibility that can benefit a variety of vision system tasks, including (e.g.) logistics applications that require top/side scanning of an object. More particularly, the arrangement allows for a maximized DOF in the case of moving objects viewed from an extreme perspective. These performance characteristics also allow the number of cameras used to image objects arrangement to be minimized. That is, other systems based on multiple cameras generally require a relatively greater number of readers to cover the same DOF as the illustrative arrangement herein, while such other systems struggle with perspective distortion, a reduced usable FOV and a requirement of differing focal distance for each camera in the system. Typically such systems must incorporate three or four cameras (with a significant increase in system complexity and data volume to be processed) to perform the same operation a single (or possibly two) camera assembly can perform herein. The illustrative arrangement also inherently integrates low drift characteristics and allows for conventional autofocus functionality. Notably, the illustrative arrangement maximizes DOF with no (free of) changes to sensor or camera housing hardware aside from the use of a modified opto-mechanical in the lens configuration and forward of the lens (e.g. a folding mirror).

Figure 14:
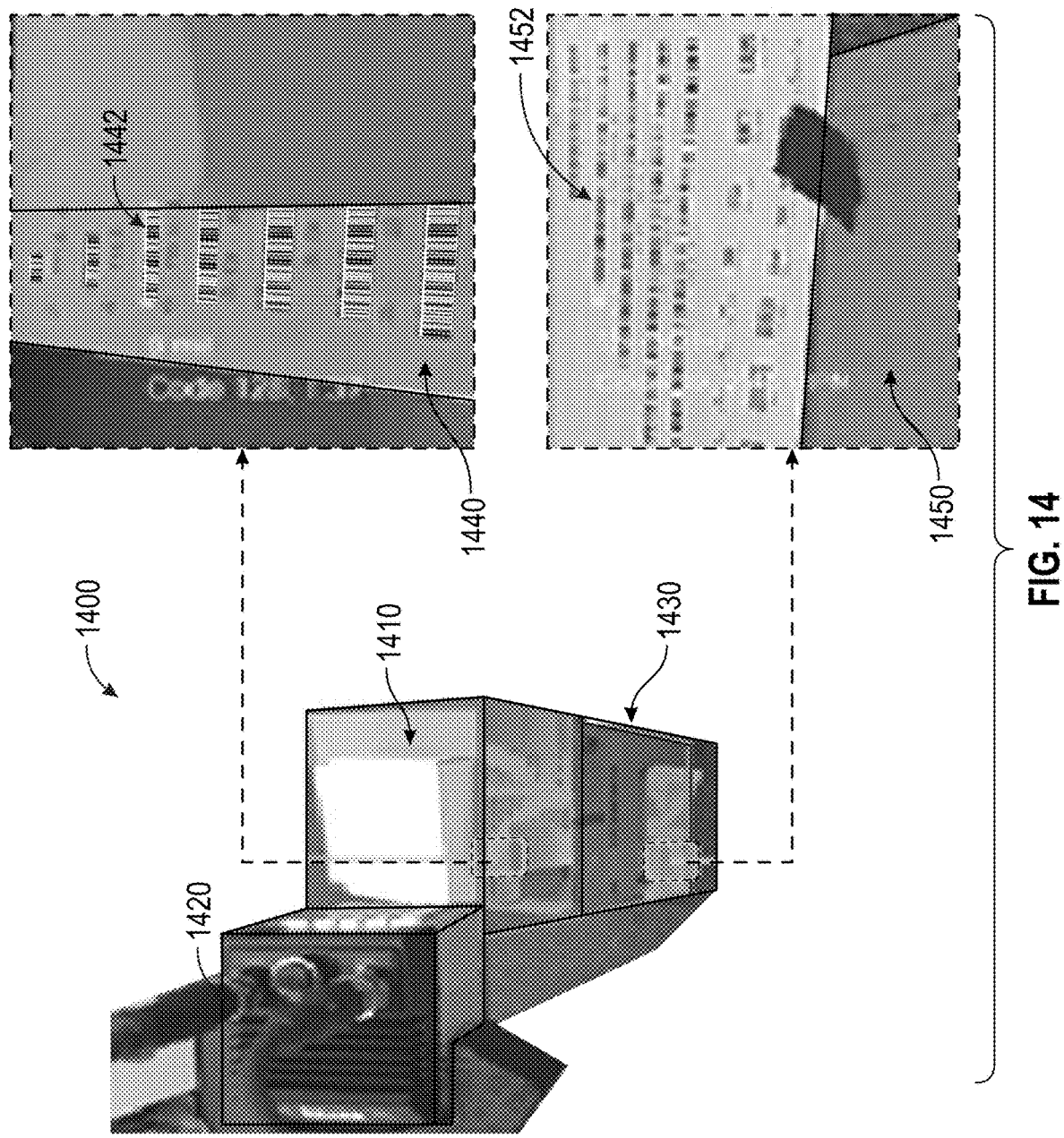
FIG. 14 is a diagram of an image of a stack of objects having exemplary ID codes printed thereon, acquired using the principles of the system and method herein.

Reference is now made to FIG. 14, which shows results of an exemplary image of a plurality of objects (a stack of boxes) 1410 acquired according to an illustrative embodiment herein. In this example, a camera assembly 1420 having (e.g.) a 24-millimeter F6 lens has been implemented on a tilted position working together with a 5-Mp image sensor. The position of the lens is arranged to focus upon the plane of interest 1430 of the object(s). In this configuration, the FOV is increased so that the plane of interest 1430 defines an observable height of approximately 750 millimeters. In general, distortion can be observed inside the plane of interest 1430. An upper image segment 1440 and lower image segment contain identifiable ID codes 1442, 1452 that are relatively small (e.g., 10 mil—which is typically a minimum size in various logistics applications).

Similarly, FIG. 15 shows an image 1500 of the FOV with a sharply focused region (arrow 1510) that spans substantially the entire height thereof by employing the principles of the system and method herein, which provide enhanced DOF. Conversely, a much smaller focused region (arrow 1610) occurs using conventional optics in the image 1600 of the same FOV in FIG. 16.

V. Conclusion

It should be clear that the system and method described above effectively expands DOF and the ability to precisely image a taller object by advantageously combining a vision system, a glass lens designed for both regular (on-axis) and Scheimpflug configurations, a variable (e.g. liquid) lens and a mechanical system to adapt the lens to the different configurations without (free of) screwing-out (or otherwise detaching) the optics and associated mechanics. This system and method effectively addresses certain challenges encountered in, for example, logistics applications, and provides ID code readers with improved features that increase performance, reduce the complexity of the installation, and provide more flexibility for a single lens, that can now be employed in different applications. Notably, the above-described system and method does not require (in various embodiments) the acquisition of multiple images, sweeping different optical powers over all, or part, of available dynamic range and/or exhaustive calibration prior to runtime operation.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for maximizing depth of field (DOF) with respect to an object imaged by a vision system camera comprising:
   an image sensor that transmits image data to a vision system processor, the image sensor defining a system optical axis;
   a lens assembly arranged to provide a high DOF and low drift, the lens assembly defining a steerable lens optical axis;
   a variable lens, arranged between the lens assembly and the image sensor, that changes focus in response to the vision system processor; and
   a tilting mechanism that steers the steerable lens optical axis relative to the system optical axis in response to object distance information in the vision system processor so as to maximize DOF, wherein the variable lens changing focus includes changing a focal length based on a current angle of the steerable lens optical axis relative to the system optical axis.

2. The system as set forth in claim 1 wherein the tilting mechanism is constructed and arranged to (a) vary a relative angle of the lens assembly or (b) vary a relative angle of a steerable mirror located between the lens assembly and the object.

3. The system as set forth in claim 2 wherein a folding mirror is located between the steerable mirror and the object.

4. The system as set forth in claim 2 wherein the tilting mechanism operates on each of two orthogonal axes.

5. The system as set forth in claim 1 wherein the variable lens comprises a liquid lens.

6. The system as set forth in claim 5 wherein the lens assembly comprises a stack of solid or glass lenses mounted in a tilting mount with respect to a housing containing the image sensor and the liquid lens is mounted in the tilting mount.

7. The system as set forth in claim 1 wherein the lens assembly, variable lens and the image sensor define an optical path with respect to the object, the optical path being variable between an on-axis and a non-on-axis configuration, in which an optical plane of the lens assembly is non-parallel with an image plane relative to the image sensor.

8. The system as set forth in claim 7 wherein the non-on-axis configuration comprises a Scheimpflug configuration.

9. The system as set forth in claim 1 wherein the vision system processor is arranged to find and decode 1-dimensional and 2-dimensional ID codes in the image.

10. The system as set forth in claim 9 wherein the object moves through a field of view (FOV) of the vision system camera in a logistics operation.

11. A method for maximizing depth of field (DOF) with respect to an object imaged by a vision system camera by projecting light from the object onto the image sensor along an optical path, the optical path steerable through a lens assembly of solid or glass lenses and a variable lens responsive to an image processor, in which the optical path is moved to a prevailing angle by a mechanical system that steers the optical path, the method comprising the steps of:
 determining a distance between the object and an image plane of the vision system camera based upon constraints that comprise at least one of (a) a speed of motion of the object, (b) a maximum size of the object, and (c) a minimum distance between the object and another adjacent object moving at the speed of motion;
 determining the prevailing angle of the optical path with respect to the image plane;
 steering the optical path with the mechanical system based on the prevailing angle;
 setting a focal length of the variable lens to focus the projected light with respect to a plane of interest on the object based on the determined prevailing angle of the optical path with respect to the image plane; and
 acquiring an image with the vision system camera.

12. The method as set forth in claim 11 wherein the mechanical system varies an angle the optical path by tilting the lens assembly with respect to the housing or a varying a relative angle of a steerable mirror located between the lens assembly and the object.

13. The method as set forth in claim 11, further comprising, setting a desired DOF by tilting the optical path and adjusting a focus of the variable lens.

14. The method as set forth in claim 11 wherein the variable lens is a liquid lens.

15. The method as set forth in claim 11, further comprising, finding and decoding at least one 1-dimensional or 2-dimensional ID code on the object.

16. The method as set forth in claim 11, further comprising, directing the object in motion through a field of view (FOV) of the vision system camera.

17. The method as set forth in claim 16, further comprising, directing another object, adjacent to the object, in motion through the FOV and acquiring an image of each of the object and the other object.

18. The method as set forth in claim 11 wherein the lens assembly, variable lens and the image sensor define an optical path with respect to the object, the optical path being variable between an on-axis and a non-on-axis configuration in which an optical plane of the lens assembly is non-parallel with the image plane.

19. The method as set forth in claim 18 wherein the non-on-axis configuration comprises a Scheimpflug configuration.

20. The method as set forth in claim 11, further comprising finding and decoding 1-dimensional and 2-dimensional ID codes in the image with a vision system processor.

* * * * *